United States Patent
Nelson et al.

(10) Patent No.: US 9,451,782 B2
(45) Date of Patent: Sep. 27, 2016

(54) DEPOSITING DEVICE

(71) Applicant: NESTEC S.A., Vevey (CH)

(72) Inventors: Roy B. Nelson, Blackpool (GB); William Walter Coatesworth, York (GB); John Howard Walker, York (GB); Jonathan Sutton, York (GB); Richard Johnson Craggs, North Yorkshire (GB)

(73) Assignee: NESTEC S.A., Vevey (CH)

( * ) Notice: Subject to any disclaimer, the term of this patent is extended or adjusted under 35 U.S.C. 154(b) by 0 days.

(21) Appl. No.: 14/498,463

(22) Filed: Sep. 26, 2014

(65) Prior Publication Data

US 2015/0008609 A1 Jan. 8, 2015

Related U.S. Application Data

(63) Continuation of application No. 10/596,721, filed as application No. PCT/EP2004/014198 on Dec. 14, 2004, now Pat. No. 8,915,402.

(30) Foreign Application Priority Data

Dec. 22, 2003 (EP) .................................... 03029566

(51) Int. Cl.
*A23G 1/20* (2006.01)
*B65B 39/00* (2006.01)
*B05B 12/08* (2006.01)
(Continued)

(52) U.S. Cl.
CPC ................. *A23G 1/208* (2013.01); *A23G 1/56* (2013.01); *A23G 3/02* (2013.01); *A23G 3/0294* (2013.01); *A23G 3/346* (2013.01); *A23G 9/28* (2013.01); *B05B 12/087* (2013.01); *B05C 5/0225* (2013.01); *B29C 44/3492* (2013.01); *B65B 39/004* (2013.01); *A23G 2220/02* (2013.01); *B29K 2105/04* (2013.01)

(58) Field of Classification Search
CPC .... A23G 3/02; A23G 3/0236; A23G 3/0294; A23G 2220/02; B05B 12/087; B05C 5/02; B05C 5/0225; B65B 39/004
USPC .................. 222/190, 255, 504; 425/4 R, 449; 426/312, 474
See application file for complete search history.

(56) References Cited

U.S. PATENT DOCUMENTS 2,013,016 A  9/1935  Vogt
3,422,648 A  10/1961 Lemelson
(Continued)

FOREIGN PATENT DOCUMENTS

DE  724968   9/1942
EP  0221369  5/1987
(Continued)

*Primary Examiner* — J. Casimer Jacyna
(74) *Attorney, Agent, or Firm* — K&L Gates LLP

(57) ABSTRACT

The invention is a depositing device for depositing flowable food containing gas comprising a pressurized feed N line conveying flowable food containing gas under pressure into the food; piston means operatively connected to the feed line comprising a piston and a chamber; an outlet to deliver food at the atmospheric pressure into molds. The device comprises a pressure retaining means arranged to retain the product in the chamber at the same pressure as the line pressure and to deliver the product through the outlet as pressure in the chamber increases from the line pressure upon descent of the piston in the chamber.

11 Claims, 3 Drawing Sheets

(51) Int. Cl.
  *B05C 5/02* (2006.01)
  *A23G 1/56* (2006.01)
  *A23G 3/02* (2006.01)
  *A23G 3/34* (2006.01)
  *A23G 9/28* (2006.01)
  *B29C 44/34* (2006.01)
  *B29K 105/04* (2006.01)

(56) References Cited

U.S. PATENT DOCUMENTS

| | | |
|---|---|---|
| 4,637,788 A | 1/1987 | Richards |
| 5,017,390 A * | 5/1991 | Sawant ............... A23G 3/2069 426/100 |
| 5,151,288 A * | 9/1992 | Curry ................. A23G 9/281 165/156 |
| 5,207,352 A | 5/1993 | Porter et al. |
| 5,285,932 A | 2/1994 | Boudreau |
| 5,368,458 A | 11/1994 | Addeo et al. |
| 5,370,888 A * | 12/1994 | Hachiya ............... A23G 1/208 426/103 |
| 5,718,354 A | 2/1998 | Binley |
| 2002/0176917 A1 * | 11/2002 | Brown .................... A23P 1/16 426/474 |
| 2005/0215660 A1 | 9/2005 | Tomikawa et al. |

FOREIGN PATENT DOCUMENTS

| | | |
|---|---|---|
| EP | 0332952 | 7/1989 |
| WO | WO9419963 | 9/1994 |
| WO | WO0213618 | 2/2002 |

\* cited by examiner

DEPOSITING DEVICE

PRIORITY CLAIM

The application is a continuation of U.S. application Ser. No. 10/596,721, filed May 25, 2007, which is a U.S. national stage filing of International Appl. No. PCT/EP04/014198, filed Dec. 14, 2004, which claims priority to European Patent Appl. No. 03029566.1, filed Dec. 22, 2003, the entire contents of which are expressly incorporated herein by reference thereto.

FIELD OF INVENTION

This invention relates to the production of food containing gaseous bubbles in a controlled manner. The invention is more particularly related to the depositing of aerated food from pumpable ingredients in which the food can be deposited reproducibly and with more uniform foam characteristics and weight control.

BACKGROUND

Methods for producing aerated fat based products are known. For instance, EP 0 322952 B1 relates to aerated ice confections and aerated chilled confections. Chocolate or suitable vegetable fat containing material is melted in a container, tempered and pumped by a pump to a mixer and pressurized $CO_2$ is supplied to the mixer and the molten chocolate is dispensed by a dispenser having a dispensing valve. When the dispensing device is put in the non-dispensing position, the chocolate is recirculated through a backpressure valve, through degasifying means, such as a static mixer, to the container. Accurate control of the amount of product deposited is difficult due to the product velocity in the lines and requires anticipation of the deposited volumes. Furthermore, this process is complex and energy consuming, as it requires a recirculation of the chocolate and degasification of the recirculated chocolate.

WO 94/19963 relates to a method for dispensing an aerated composition comprising the step of: (a) introducing the composition under pressure into a first volume, (b) allowing the first volume to expand to a second volume at which the pressure of aeration is ambient, and (c) dispensing the second volume of aerated composition.

W002/13618 relates to a method for making a cellular food product, by dispersing and/or dissolving under pressure a gas in a food product comprising at least a butterfat, then by expansion to produce cell-formation. The method involves depositing a cellular food product in the form of individual products, or at least strip, whereof the shape is globally preserved as long as it is not subjected to a compression force. The pressure is progressively reduced along the line thereby causing the product to expand before it is deposited.

U.S. Pat. No. 4,637,788 relates to a valve type depositor for depositing an aerated confection. The valve opens and closes to deposit material. Pressure is released on the exit of the valve. The pressure of the system is held constant by always having the same number of valves open. Therefore, there is always material being deposited from some part of the depositor system. The system described in U.S. Pat. No. 4,637,788 does not have the ability to deposit along the full length of all moulds. The depositing system described herein relies on depositing material at some point of the mould and subsequently redistributing the material by vibrating the moulds. This leads to uneven bubble structure along the product and important loss of aeration.

The present invention aims at proposing a solution for depositing a pumpable product which contains gas while accurately controlling weight and volume of the deposited mass and uniformity of the foam produced.

For that, the invention relates to a depositing device for depositing flowable food containing gas comprising
a pressurized feed line conveying flowable food containing gas under pressure into the food
piston means operatively connected to the feed line comprising a piston and a chamber;
an outlet to deliver food at the atmospheric pressure into moulds. An improvement of the depositing device is to have pressure retaining means arranged with the piston means to fill the piston means with pumpable product whereas the product in the filled chamber is maintained at the line pressure. This keeps the food under pressure until the point at which it is deposited. This largely maintains the gas within the food so that the food is not in an aerated form. The bubbles only form as the food enters the mould. From then on, there is less physical action on the bubbles to distort them. Therefore, the benefit of maintaining the filled chamber at the line pressure is that it ensures the gas remains in solution so that the depositing mechanism is dealing with a liquid not a foam guaranteeing the correct weight and volume of product delivered. In other words, the gassed product in the chamber is not given the possibility to expand in the chamber in an uncontrolled manner which would, at the time of depositing in the mould leads to dosing accuracy problems, gas pockets or lack of uniform size distribution of the bubbles.

More particularly, a pressure retaining means is arranged to retain the product in the chamber at the same pressure as the line pressure and deliver the product through the outlet as pressure in the chamber increases from the line pressure upon descent of the piston in the chamber. The pressure retaining means ensures that the filled chamber is maintained at super-pressure where the gas remains substantially in the dissolved state of transport but also allows the product to be discharged once the pressure exceeds a certain threshold by the effect of the piston descending into the chamber.

The pressure retaining means can be a pressure-actuated valve arranged at the outlet. This solution is simple and reliable. Therefore, the valve automatically opens when the pressure exceeds the line pressure by a certain threshold value. It ensures that the pressure is retained in the piston means which maintains the gas inside the product until the piston means is activated for dispensing, so no specific control of the opening of the valve is necessary. Preferably, the pressure-actuated valve could be a spring-loaded nozzle. Preferably, the valve can be calibrated to open at a pressure of more than 0.5 bars above the line pressure. Therefore, this guarantees that it is only at the point of entry into the mould that the pressure decreases and the chocolate starts to expand.

The line pressure may be preferably maintained at a pressure of between 2 to 30 bars, preferably 6 to 15 bars. Therefore, the product delivered to the piston means is always fresh and has the correct quantity of gas.

Another improvement is to have a second valve means which is arranged between the feed line and the chamber and which operates between an opening position wherein the chamber is filled with flowable food and a closed position wherein the chamber is isolated from the feed line. The second valve means ensures the chamber is hermetically closed after filling while the pressure inside the chamber is maintained. Therefore, depending on the seal properties of the valve, no gas or, at most, very small amounts of gas can escape out of the chamber back to the feed line when pressure exceeds the feed line pressure once piston starts its descent.

In a preferred embodiment, the valve at the feed line has a rotary valve bar comprising at least one passage upon rotation of the valve at a coinciding position between the feed line and the chamber and has a sealing surface extending along an angular path of at least 90 degrees, preferably 130 degrees, most preferably of 180 degrees. A rotary valve has the advantage to require low force to activate between the open and close position and it furthermore provides an extensive sealing surface that ensures no gas loss and sedimentation problems. Sediment problems are caused by the solid particles of the chocolate building up between the body or housing and the rotating valve bar.

In a preferred embodiment, the invention also relates to a device for producing food containing gaseous bubbles from a pumpable product comprising:

a plurality of depositing devices as aforementioned, a feed line for conveying the pumpable product to the depositing devices, pump means for providing speed to the pumpable product through the feed line, a source of gas for incorporating gas into the pumpable product and connected to the feed line, the pump means being arranged to draw off gas from the gas source and control gas intake into the feed line by the control of the speed of the pump means.

As opposed to prior art devices, pump means are disposed for transporting the pumpable product and utilized to regulate the gas intake into the system. More particularly, the pump means comprises a first and second pumps arranged in series along a portion of the feed line. The line pressure is generated entirely by the first pump whereas the second pump controls the gas flow into the region between the two pumps. In particular, the line pressure is substantially maintained at a constant value from the exit of the first pump to the depositing devices to ensure that the product does not expand in the line before it is deposited.

The first and second pumps are driven at relative different speeds to create a suction effect within the portion of the feed line. Therefore, the second pump is driven at a speed higher than the speed of the first pump thereby incorporating gas into the portion of the feed line at a point upstream the second pump. As a result, while the first pump ensures accurate metering of the pumpable product through the feed line, the second pump regulates more precisely the gas intake into the product. Therefore, control of the gas intake into the pumpable product can be made by controlling the speed of the second pump relative to the speed of the first pump, in particular, to set the desired quantity of the product coming out of the depositing device. For instance, the ratio of speed of the first pump to the speed of the second pump may be controlled within a range of from 1:1 to 1:5.

The pumps may be of very different types as typically used for transporting flowable liquid and viscous food. Preferably, the pumps are gear pumps, vane pumps, pawl pumps, centrifugal pumps or screw pumps.

The invention also relates to a method for aerating and depositing an aerated food comprising pumping the food from a source of liquefied food, adding gas from a source of gas in controlled amounts in the liquefied food to produce a gasified food;

maintaining a constant pressure of the gasified food up to depositing means including retaining means which retain the product at said pressure before the depositing point to prevent the product from expanding;

depositing amounts of the gasified food by forcing the product through the depositing point.

DETAILED DESCRIPTION

Figure 1:
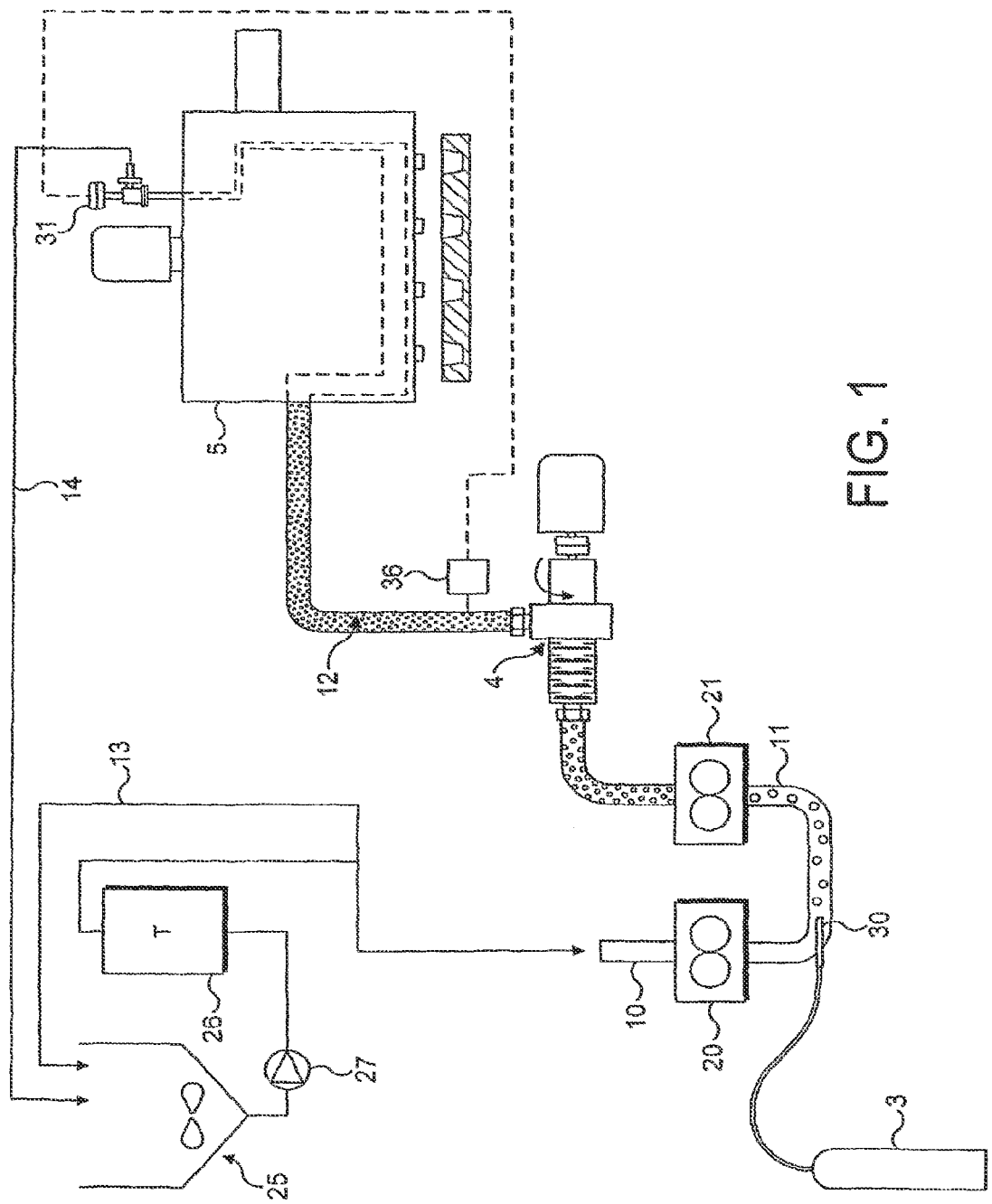
FIG. 1 is schematic view of the device of the invention.

Referring to FIG. 1, a preferred arrangement of the device of the invention is shown for gassing and subsequently depositing at high speed a fat based confectionery such as chocolate in a plurality of moulds arranged in conveyed rows. The fat based confectionery comes in a melted liquid from a kettle 25 transported to a temperer 26 by a pump 27. From the temperer, the liquid product enters the feed line 10 at the beginning of the device of the invention while an excess of product recirculates to the kettle 25 through recirculating line 13. Tempering is a known technique in the manufacturing of chocolate confectionery which aims at inducing the correct polymorphic forms of crystals in the chocolate fat so that when the products cool down, the product sets with the desired shiny and gloss appearance. The temperer is optional and it could be removed from the device of the invention, especially, when considering non-tempering fat-systems such as compounds.

The device comprises a first pump 20 which ensures accurate metering of the confectionery product through the feed line. A second pump 21 is provided along the feed line at a distance from the first pump 20 to delimit with the first pump 20, a portion of tube 11 in-between. A gas source 3 is provided with a gas inlet that communicates with the feed line at some point of the portion of tube 11. The gas source is typically a bottle of compressed gas such as $CO_2$, $N_2$, $N_2O$ or $O_2$ or any other gas compatible with food which will at least partially dissolve under pressure. The outlet of the gas is usually a non-return gas delivery means such as a gas lance comprising a terminal tube with a plurality of openings encased in an outer plastic sleeve. The second pump regulates the gas intake into the product depending upon the speed at which it activates relative to the first pump. When the second pump 21 activates at a speed higher than the first pump, the product is accelerated at the portion of tube 11 which creates a suction effect which draws off more gas from the gas source. As the speed of pump 21 increases, more gas is drawn off in the system. Control of the speed of pump 21 relative to the speed of pump 20 regulates the gas intake at the desired concentration into the product. Gas flow rate for gassing chocolate component is typically controlled at an even value comprised within a range of from 1 to 50 liters/minutes to deliver a chocolate product having a density of from 0.5 to 1.1 $g/cm^3$.

Therefore, pump 20 is mainly utilized to transport the fat based confectionery at the required pressure, for instance, 5 to 10 bars, and is therefore maintained constant, whereas the second pump 21 regulates the gas intake. As the second pump runs faster, it reduces the pressure between the two pumps and causes a controlled amount of gas to be introduced. The second pump also prevents the formation of long filaments of gas in the chocolate.

Of course, it would also be possible to regulate the gas intake between the two pumps by changing the speed of the first pump while maintaining the second pump constant. However, this would affect the overall pressure and metering of the product in the discharge area which would not be suitable. It is so preferred to control the gas level by adjusting the speed of pump 21 to avoid a negative effect on the metering of the product. It can be noted that the second pump 21 can act as a coarse preliminary mixer. Gas cells present in the product are broken down into smaller cells and partially dissolved.

The second pump 21 has also the function to ensure there is no surge of gas as pressure drops in the system after each product discharge from the discharge means. Indeed, as product sequentially discharges, such as by depositing a metered amount of product in moulds, fresh product is drawn into the discharge means, e.g., piston depositing means, which causes a drop of pressure and consequently more gas drawn. Therefore, the pump 21 being maintained at a controlled higher speed as pump 20, enables to prevent gas surge from happening and to even the gas intake in the system.

At the exit of the second pump 21, a mixer or beater 4 is preferably installed. This apparatus is useful to provide a finer and more homogeneous distribution of gas in the confectionery product. As gas is better distributed, the final product also gains in uniformity and weight can be better controlled. The benefit also of the mixer or beater is that mixing is obtained without temperature rise which could create a loss of temper. For this, the apparatus is actuated at preferably lower speed and has a high surface area to treat a large amount of product at a time. A suitable mixer or beater is for instance, a continuous pins mixer which can treat up to 1000 Kg/hour without using excessive cooling jackets. A pin mixer is typically formed of an outer stator having static pins that intermesh with dynamic pins of a central rotor. In order to thoroughly mix the gas and the confectionery product together while avoiding the loss of temper, the mixer is preferably driven at a speed of less than 500 rpm, even more preferably between 100 to 300 rpm. When exiting the mixer, the product is usually homogeneously gassed with gas being essentially dissolved homogeneously in the product.

The pressure in the line 12 can be advantageously controlled by a pressure transducer 36 that senses the pressure before the depositing device 5. If the pressure exceeds a certain limit, e.g., above a 15-bar limit, the pressure transducer controls the opening of a pressure sustaining valve 31 in fluid communication with the manifolds of the depositor, and situated at a point above the depositing device, so that the excess of product is sent back to the product kettle 25 via a recirculating line 14 and until the line pressure is lowered to the desired pressure in the system. This pressure control in combination with the control of the gas intake by the pumps enables to maintain the level of gas dissolved in the product at a substantially constant rate in the line and so participates to the end benefits on weight control, repeatable and uniform amount of gas in the delivered product.

Figure 2:
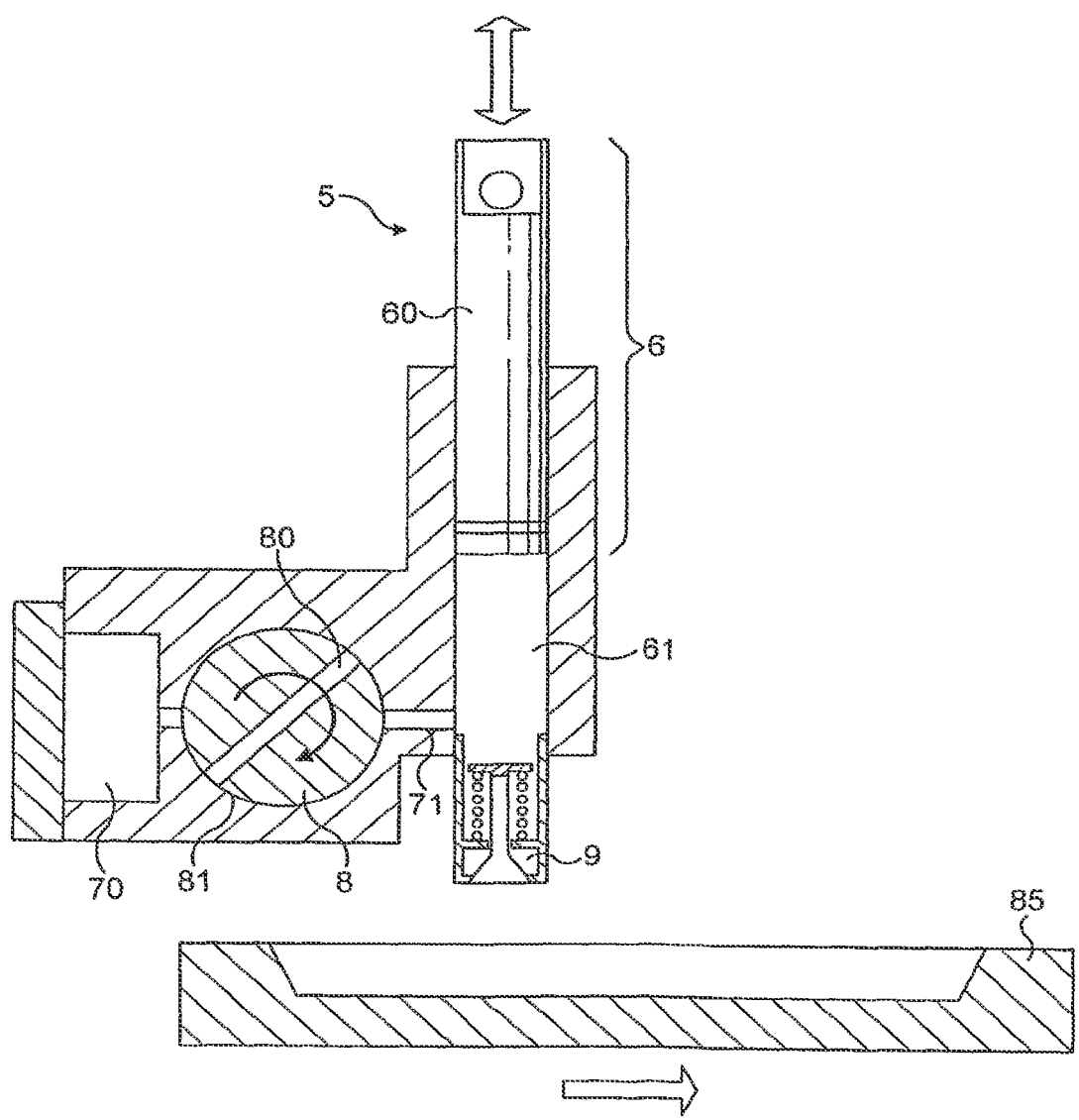
FIG. 2 is a view of the depositing system.

FIG. 2 illustrates a depositing device 5 of the invention able to deposit a metered amount of gassed product into a conveyed mould. The mould can be empty or, alternatively already partially filled to form layers or a shell, for instance, a chocolate U-shaped shell for receiving a deposited centre of gassed product. The depositing device 5 of FIG. 2 shows a single depositing head for reasons of simplicity whereas the depositing device of FIG. 1 shows a multi-head depositing device 5 which is formed from a plurality of depositing devices 50 of FIG. 2 placed in parallel and fed by manifolds connected to the feed line 12.

The depositing device comprises a pressurized manifold 70 to enable product to come into the device. The manifold communicates to a piston arrangement 6 including a piston or plunger 60 moveably arranged into a product receiving chamber 61. Between the manifold 70 and the piston arrangement is provided a feed channel 71 which opening is selectively controlled by a rotary valve 8. The valve 8 has a form of a cylinder and is housed in the block of the manifold and can rotate between a position wherein the channel 71 coincides with a channel 80 of the valve and a position wherein the channel 71 is closed by a cylindrical sealing surface 81. Several channels 80 could be foreseen in the valve distributed at an angular path of less than 180 degrees but the preferred embodiment is to have only one single channel 80 which delivers a 180-degree sealing surface on each side of the channel.

The piston arrangement moves towards a depositing outlet which forms a pressure actuated nozzle assembly 9. The pressure actuated nozzle assembly is there to deliver product only at a threshold of product pressure inside the piston means 6. This guarantees that the confectionery product can only start to expand at the point of entry into the mould and no drips or in flight foamed confectionery remains at completion of the deposit.

Figure 3:
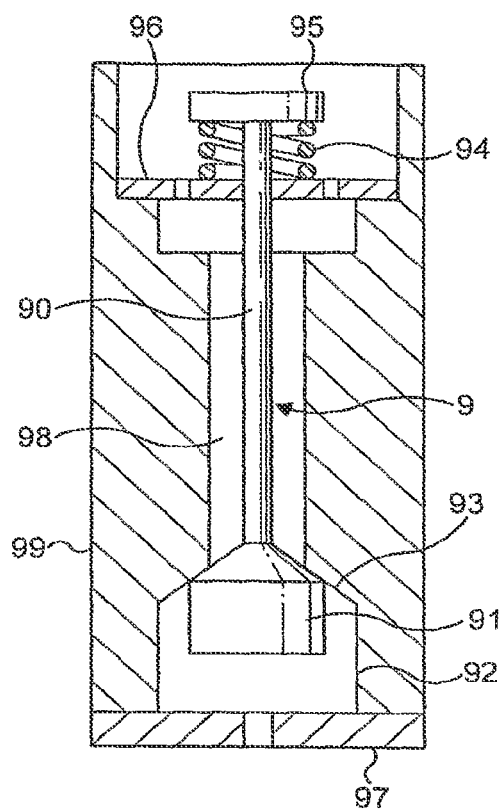
FIG. 3 is a schematic cross-section view of the pressure-retaining nozzle in a preferred embodiment.
Figure 4:
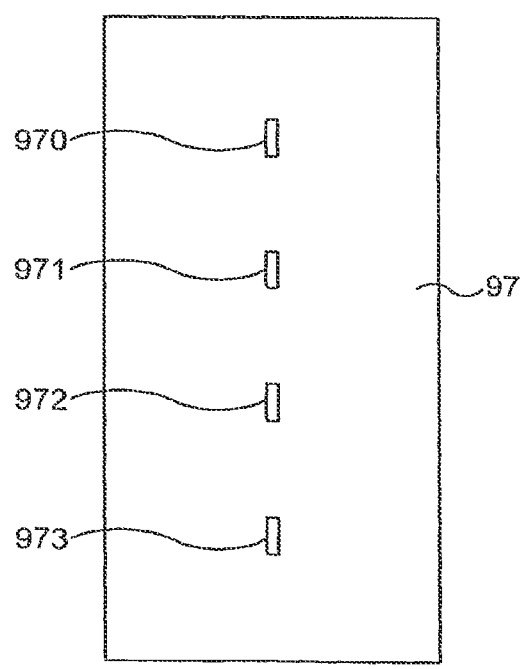
FIG. 4 is a bottom view of the nozzle of FIG. 3.

FIG. 3 shows a detailed view of the nozzle assembly. The nozzle assembly comprises a spring loaded moving portion of stem 90 that terminates by a sealing portion 91 which co-acts in closure with an abutting portion 93 of a delivery chamber 92. The portion of stem 90 is housed in an elongated opening 98 of the body 99 of the nozzle which opening has a larger cross-section than the stem to let product pass through.

At rest, the portion of stem is maintained in a closure position with the sealing portion 91 abutting against the abutting portion 93 of the chamber by the effect of a resilient element, e.g., a helicoid spring 94, acting against a pressure plate 95 connected to the stem and a fixed part of the body of the nozzle such as an apertured plate 96. When product is delivered under the pressure of the piston, the product passes through the holes of the plate 96, through the opening 98, until to exert a pressure on the sealing portion 91 at a magnitude that exceeds the force of the resilient means against the two plates 95, 96 which causes a gap to form between the portions 91 and 93 and product to enter the delivery chamber 92.

The nozzle can be equipped with a spreader 97 which splits the stream up from two to ten streams, for instance, four streams 970, 971, 972 and 973 to aid distribution of the confectionery product from the delivery chamber to the mould's cavities.

The piston 60 is driven under servo control which enables to deliver more than one shot, i.e., charging the chamber up in one movement and the piston brought down in multiple steps delivering small discrete volumes of product down to less than 1 gram at high speed. This very precise dosing is rendered possible thanks to the configuration of nozzle and rotary valve which can open and close very reliably at high speed. Speeds up to 40 strokes per minutes can be achieved and up to deliver circa 160 small discrete shots.

The rotary valve 8 and piston 60 can be electronically or mechanically linked to coordinate the removal of the piston with the opening of the valve. This linkage can be made by any suitable transmission mechanism that transfers the movement of linear withdrawal of the piston into a rotary movement of the valve in the opening position. This can be done, for instance, by a cam or gear. Alternatively, a central controller can be provided that coordinates the motion of the valve and the motion of the piston independently.

Example 1

The depositing device of the invention, as illustrated in FIG. 1, was compared with a Mondomix aeration system (Haas-Mondomix BV) fitted with a manifold depositor of the type where orifices open for a fixed time to deposit aerated material. The manifold depositor was adjusted to give the optimum balance of deposits across its width. The two aeration systems were set to aerate with $CO_2$ at a target density of 0.6 g/cm$^3$.

Each system was used to make a number of simple deposits (without pre-shelling) into mould cavities so as to completely fill them. Then the moulds were weighed to assess the consistency of deposit weight. Different cavity sizes were used for the two depositors as the depositors had been constructed for moulds with different cavity spacings and volumes. To compare the two systems, the coefficient of variation was calculated by dividing the standard deviation by the mean weight.

154 cavity deposits using the depositor of the invention were collected and weighed.

| | |
|---|---|
| Maximum weight | 31.14 g |
| Minimum weight | 28.69 g |
| Mean weight | 31.14 g |
| Std Deviation | 0.56 g |
| Coefficient of variation | 0.018 |

69 cavity deposits were collected and weighed for the Mondomix with a manifold depositor.

| | |
|---|---|
| Maximum weight | 109.61 g |
| Minimum weight | 88.83 g |
| Mean weight | 103.22 g |
| Std Deviation | 3.48 g |
| Coefficient of variation | 0.034 |

It can be seen by comparing the coefficients of variation that the invention leads to improved consistency in deposit weight.

The invention is claimed as follows:

1. A method for aerating and depositing an aerated food comprising:
   pumping a food from a source of liquefied food;
   adding gas from a source of gas in controlled amounts in the liquefied food to produce a gasified food;
   maintaining a constant pressure of the gasified food from the adding of the gas until a piston is activated to deposit the gasified food and retaining the product at said pressure in a chamber before a depositing point to prevent a decrease in the pressure of the gasified food and prevent the product from expanding; and
   depositing amounts of the gasified food by descending the piston in the chamber toward the depositing point to open an aperture leading to the depositing point and force the product through the depositing point.

2. The method of claim 1, wherein the constant pressure is between 6 and 15 bars.

3. The method of claim 1, wherein the descending of the piston comprises descending the piston in multiple steps to deliver discrete volumes of the gasified food.

4. The method of claim 1, wherein the depositing of a first portion of the gasified food through the depositing point concurrently draws a second portion of the gasified food through the aperture into the chamber.

5. The method of claim 1, wherein the pumping of the food comprises using a first pump and a second pump located in series along a portion of a feed line which leads to the chamber.

6. The method of claim 5, wherein the constant pressure is generated entirely by the first pump.

7. The method of claim 5, wherein the adding of the gas comprises directing the gas into the feed line from a gas inlet that emerges into the feed line downstream from the first pump and upstream from the second pump.

8. The method of claim 5, wherein the first pump comprises an exit, and the constant pressure is present from the exit of the first pump to the depositing of the gasified food to prevent the gasified food from expanding until completion of the depositing.

9. The method of claim 5, wherein a valve is located between the feed line and the chamber, and the method comprises operating the valve between an opening position in which the chamber is filled with the gasified food and a closed position in which the chamber is isolated from the feed line.

10. The method of claim 5, comprising driving the second pump at a greater speed relative to the first pump.

11. The method of claim 10 wherein the driving of the second pump comprises controlling a ratio of the speed of the first pump to the speed of the second pump to be between 1:1.1 and 1:2.

* * * * *